(12) United States Patent
Chang et al.

(10) Patent No.: US 6,501,522 B2
(45) Date of Patent: Dec. 31, 2002

(54) METHOD OF FABRICATING A REFLECTIVE TYPE LCD

(75) Inventors: Wei-Chih Chang, Hsinchu Hsien (TW); Hsin Ming Chen, Tainan Hsien (TW); Yun-Chieh Yuan, Taichung Hsien (TW); Yao-Nan Chen, Hsinchu Hsien (TW)

(73) Assignee: AU Optronics Corporation, Hsin-Chu (TW)

( * ) Notice: Subject to any disclaimer, the term of this patent is extended or adjusted under 35 U.S.C. 154(b) by 7 days.

(21) Appl. No.: 09/907,041

(22) Filed: Jul. 17, 2001

(65) Prior Publication Data

US 2002/0031605 A1 Mar. 14, 2002

(30) Foreign Application Priority Data

Sep. 13, 2000 (TW) .......................................... 89118757

(51) Int. Cl.⁷ ..................... G02F 1/1335; G02F 1/1337; G02F 1/13
(52) U.S. Cl. ......................... 349/113; 349/124; 349/187
(58) Field of Search ................................. 349/113, 187, 349/122, 124

(56) References Cited

U.S. PATENT DOCUMENTS

| | | | | |
|---|---|---|---|---|
| 4,519,678 A | | 5/1985 | Komatsubara et al. ...... | 349/113 |
| 5,917,567 A | * | 6/1999 | Oh et al. ..................... | 349/113 |
| 6,181,397 B1 | * | 1/2001 | Ichimura ..................... | 349/113 |
| 6,327,009 B1 | * | 12/2001 | Ichimura ..................... | 349/113 |
| 6,407,790 B1 | * | 6/2002 | Chen .......................... | 349/113 |
| 6,452,633 B1 | * | 9/2002 | Merrill et al. .............. | 257/223 |

* cited by examiner

Primary Examiner—William L. Sikes
Assistant Examiner—Tarifur R. Chowdhury
(74) Attorney, Agent, or Firm—Darby & Darby

(57) ABSTRACT

A method of fabricating a reflective type LCD, having the steps of: (a)providing a substrate; (b) forming a polymer resin layer on the substrate; (c) forming a positive-type photoresist layer on the polymer resin layer, wherein the upper surface of the photoresist layer has a convex/concave profile; and (d)performing a dry etching process to completely remove the photoresist layer and partially remove the polymer resin layer so as to shape the upper surface of the polymer resin layer into a convex/concave profile.

16 Claims, 4 Drawing Sheets

METHOD OF FABRICATING A REFLECTIVE TYPE LCD

BACKGROUND OF THE INVENTION

1. Field of the Invention

The present invention relates in general to a method of fabricating reflective type liquid crystal display (LCD). In particular, the present invention relates to a method of fabricating a concave/convex profile on a reflective film of the reflective type LCD.

2. Description of the Related Art

Currently, liquid crystal display (LCD), having the advantages of low power consumption, thin type, light weight and low driving-voltage, has been put to practical use, such as with personal computers, archival treatments, navigation systems, Gameboys, projectors, view finders and portable machines (watches, electronic calculators and televisions). In particular, a reflective type LCD can display bright images and high contrast by the reflection of the incident light, and thereby achieves lower power consumption, thinner type and lighter weight.

Mostly, the reflective type LCD employs the twisted nematic (TN) crystals or the super-twisted nematic (STN) crystals. However, the polariscope disables more than half of the illuminant and therefore darkens the brightness of the display images. In order to enhance the use efficiency of the illuminant, now the reflective type LCD employs the guest-host (GH) type crystals, that is, a combination of the nematic crystals and dichroic dyes, to change the arrangement of the crystal molecules and adjust the light-absorbency of the dyes by a electric field. Also, for further enhancing the brightness and contrast, a reflective film with a gently curved profile serving as a white scattered surface is needed because the concave/convex on the upper surface of the reflective film can increase the intensity of the incident light.

As shown in FIG. 1, an LCD 10 according to the prior art comprises a semiconductor substrate 1 and a metal wiring layer 2 formed on the substrate 1. The metal wiring layer 2 electrically connects elements (not shown) formed in the substrate 1 for driving the LCD 10, such as transistors, resistors or capacitors. A polyimide resin layer 3 is coated on the semiconductor substrate 1 and has a contact hole 4 for exposing a predetermined area of the metal wiring layer 2. A display electrode 5, made of aluminum and serving as a reflective film, is formed on the polyimide resin layer 3 and connects to the metal wiring layer 2 through the contact hole 4. The polyimide resin layer 3 has an upper surface with small protrusions or depressions having a gently curved profile, and accordingly the display electrode 5 has an upper surface with small protrusions or depressions having a gently curved profile for making a white scattered surface. The LCD 10 further comprises a transparent glass substrate 8 and a transparent conductive film 7 formed on the transparent substrate 8. A Guest-Host type liquid crystal 6 is filled in a gap between the display electrode 5 and the transparent conductive film 7.

However, if the protrusions or depressions of the display electrode 5 have sharp-pointed edges, the incident light generates multiple reflective effects and thus darkens the brightness of the display images. In order to solve this problem, the U.S. Pat. No. 4,519,678 provides two methods of fabricating the gently curved profile of the display electrode 5. In the first method, as shown in FIG. 2, the polyimide resin layer 3 is firstly coated on the semiconductor substrate 1, and then cured by a heat treatment about 100~200° C. Next, by using a mask 9 with a spot-like resist pattern wherein the openings are arranged at a pitch of 1 to 50 microns, an etching process is performed on the polyimide resin layer 3 to form a plurality of small protrusions and depressions having the concave/convex profile. Concerning the materials of the polyimide resin layer 3, if a thermosetting resin is used, it is desirable to perform an isotropic etching process, such as a wet etching method. If a thermoplastic resin is used, it is desirable to perform an anisotropic etching process, such as a dry etching or a reactive ion etching (RIE) method and then a heat treatment about 150~500° C. is necessary for rounding the edges of the protrusions or depressions after removing the mask 9. Next, a photolithography process is needed to pattern the contact hole 4 on the polyimide resin layer 3 for exposing the predetermined area of the metal wiring layer 2. Next, after covering the display electrode 5 on the upper surface of the polyimide resin layer 3, a selective etching process is performed to shape the upper surface of the display electrode 5 into the desired curved profile.

In the second method, as shown in FIG. 3A, an insulating layer 12 is first formed on the substrate 1. Then, as shown in FIG. 3B, the insulating layer 12 is etched to become a plurality of separated bumps 16 by using a mask 14. Next, as shown in FIG. 3C, after removing the mask 14, the polyimide resin layer 3 is coated on the substrate 1 by a high-speed spin coating process at 2000~5000 rpm. Since the viscosity of the polyimide resin layer 3 differs from the change in speed, the upper surface of the polyimide resin layer 3 shows a concave/convex profile depending on the arrangement of the bumps 16. Finally, as shown in FIG. 3D, the display electrode 5 is deposited on the polyimide resin layer 3 and accordingly has the gently curved profile.

From the above description, the two conventional methods are thought to be too complex to ensure the process reliability. For this reason, a third conventional method provides a simpler process for fabricating the concave/convex profile. As shown in FIG. 4A, a polyimide resin layer 22 with photosensitive and thermosetting characteristics is formed on a semiconductor substrate 20. Next, an exposure process is performed on the polyimide resin layer 22 by using a mask (not shown) with a spot-like pattern, and then a development process is performed to remove the exposed areas of the polyimide resin layer 22 so as to form the upper surface as a plurality of continuous bumps 221 or concaves 222, as shown in FIG. 4B. Next, a heat treatment is necessary for changing the viscosity of the polyimide resin layer 22 and reflowing thereof. At the same time, owing to the polyimide resin layer 22 made of thermosetting resin, the edges of the bumps 221 and the concaves 222 are rounded to become a gently curved profile 22', as shown in FIG. 4C. Finally, another heat treatment is utilized to cure the polyimide resin layer 22.

However, by the request of the high aperture ratio, the polyimide resin layer 22 with a thickness of 2~4 is needed but which always causes each bump 221 to have different thicknesses during the development process. The lack of uniformity will make the profile 22' have unsymmetrical concaves/convexes during the sequential heat treatment and reflowing. Also, the quality of the reflective film is accordingly reduced.

SUMMARY OF THE INVENTION

An object of the present invention is to provide a method of forming a reflective type LCD to solve the above-described problems.

Another object of the present invention is to provide a method of fabricating a reflective type LCD, including the steps of: (a) providing a substrate; (b) forming a polymer resin layer on the substrate; (c) forming a positive-type photoresist layer on the polymer resin layer, wherein the upper surface of the photoresist layer has a convex/concave profile; and (d) performing a dry etching process to completely remove the photoresist layer and partially remove the polymer resin layer so as to shape the upper surface of the polymer resin layer into a convex/concave profile.

Another object of the present invention is to provide a method of fabricating a reflective type LCD, including the steps of: (a) providing a substrate on which a metallic wiring layer is covered; (b) forming a polymer resin layer on the substrate to cover the metallic wiring layer; (c) forming a contact hole on the polymer resin layer to expose a part of the metallic wiring layer; (d) forming a positive-type photoresist layer on the polymer resin layer to fill the contact hole; (e) forming the upper surface of the photoresist layer as a convex/concave profile; (f) performing a dry etching process to completely remove the photoresist layer and partially remove the polymer resin layer so as to make the upper surface of the polymer resin layer have a convex/concave profile; and (g) covering a metallic reflective layer on the polymer resin layer so as to have an upper surface with a convex/concave profile.

It is an advantage of the present invention that the polymer resin layer with the concave/convex profile in the present invention is shaped by etching the photoresist layer without etching and rounding the polymer resin layer. Consequently, the method is simplified and the uniformity of the upper surface of the polymer resin layer is well controlled. This can ensure the property of the formation the reflective film.

This and other objectives of the present invention will no doubt become obvious to those of ordinary skill in the art after having read the following detailed description of the preferred embodiment, which is illustrated in the various figures and drawings.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

In the present invention, a method is provided for fabricating a reflective film with an upper surface having a gently curved profile to serve as a white scattered surface. For achieving the goal, a polyimide resin layer with an upper surface having a concave/convex profile is necessarily fabricated in advance. Hereinafter, a method of fabricating the polyimide resin layer according to the present invention is described in detail.

Figure 1:
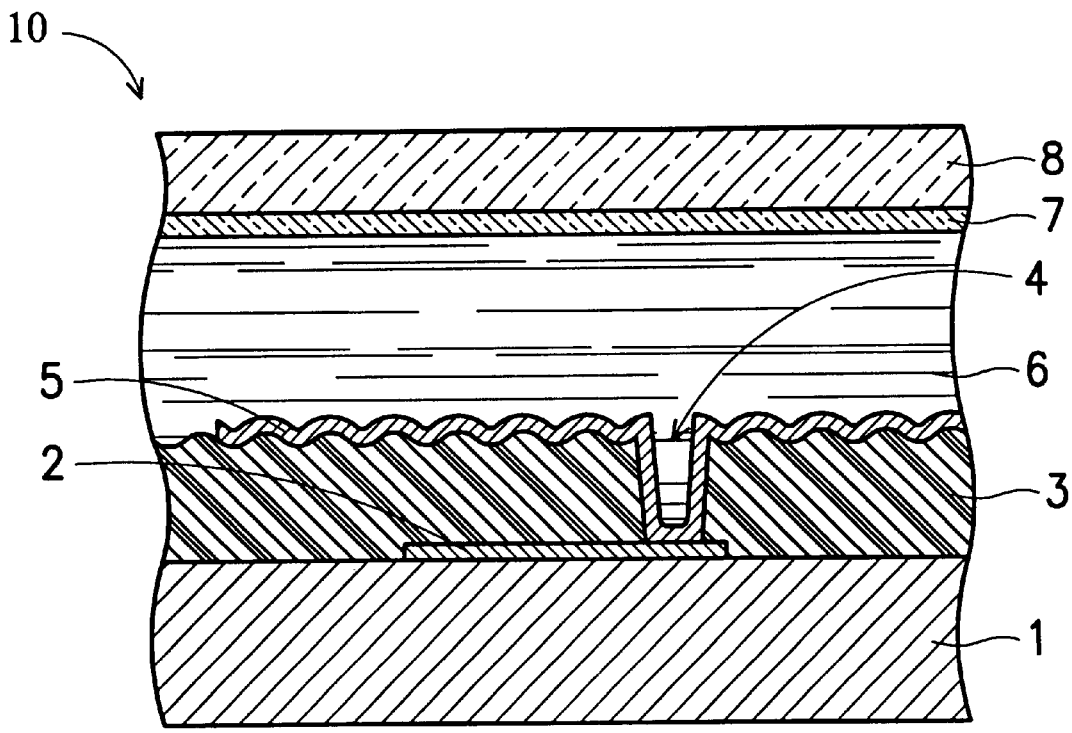
FIG. 1 is a cross-sectional schematic diagram of an LCD according to the prior art.
Figure 2:
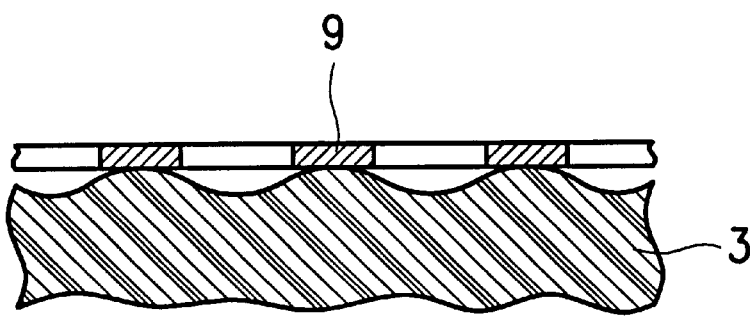
FIG. 2 is a cross-sectional schematic diagram of a first conventional method of forming a concave/convex profile.
Figure 3A:
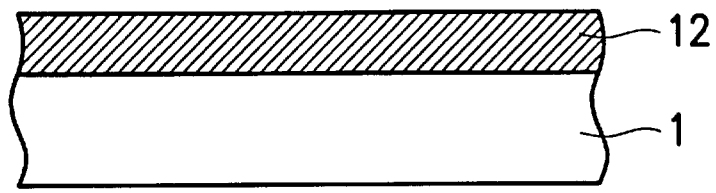
FIGS. 3A to 3D are cross-sectional schematic diagrams of a second conventional method of forming a concave/convex profile.
Figure 3B:
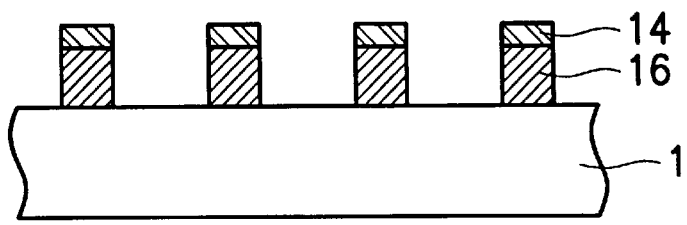
Figure 3C:
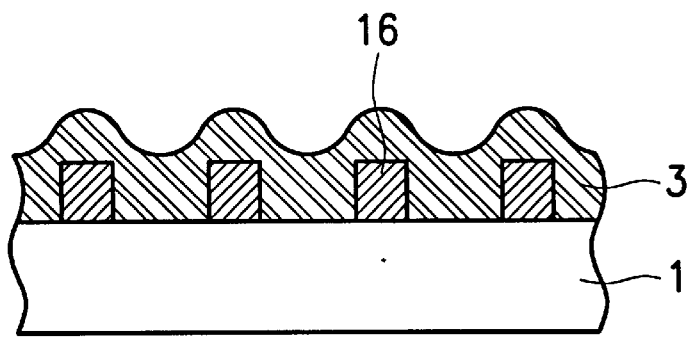
Figure 3D:
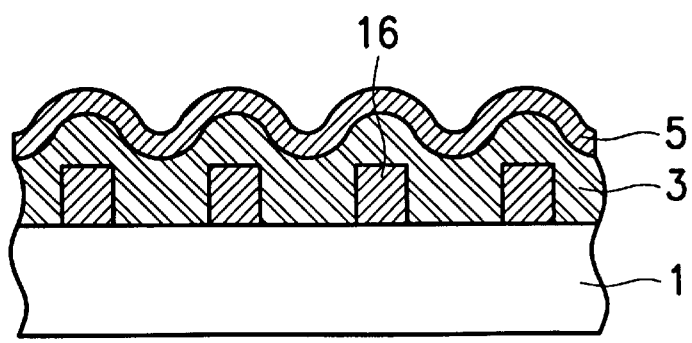
Figure 4A:
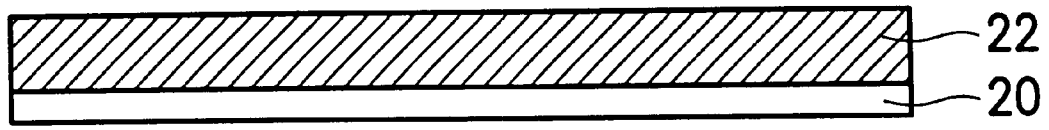
FIGS. 4A to 4C are cross-sectional schematic diagrams of a third conventional method of forming a concave/convex profile.
Figure 4B:
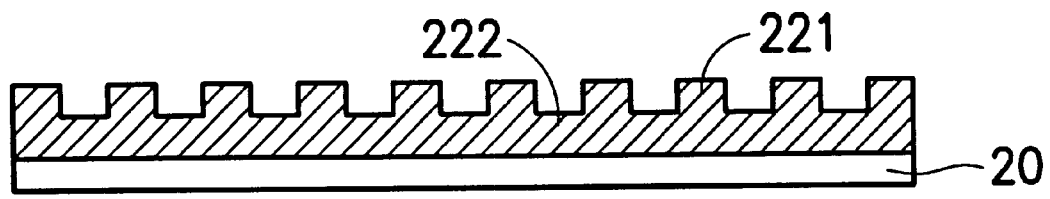
Figure 4C:
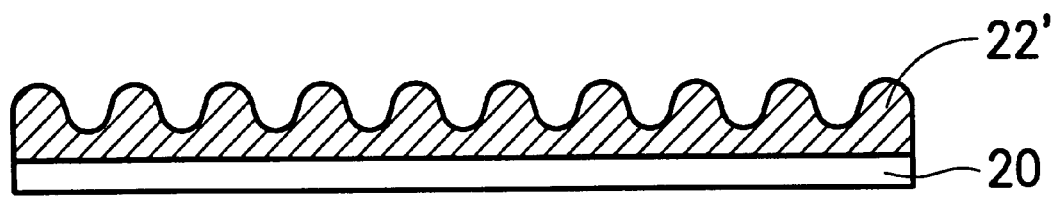
Figure 5A:
FIGS. 5A to 5C are cross-sectional schematic diagram of the method of fabricating the polyimide resin layer according to the present invention.
Figure 5B:
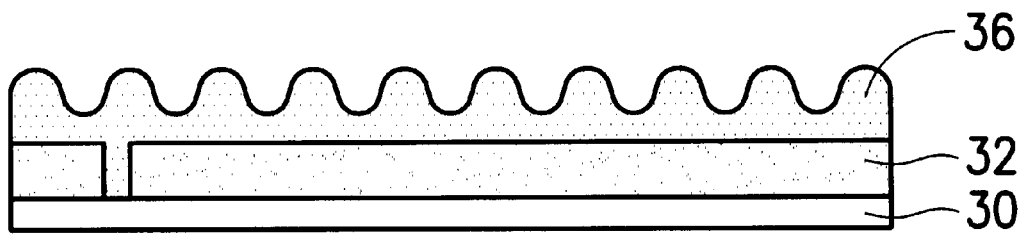
Figure 5C:
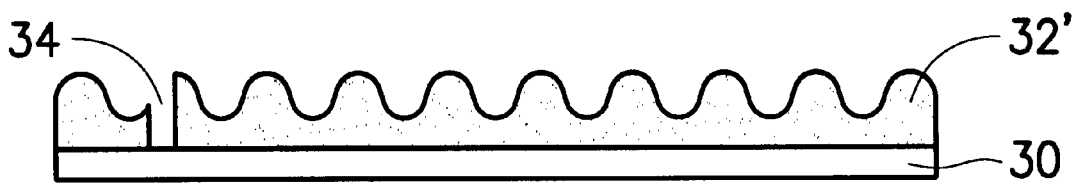

Please refer to FIG. 5. FIGS. 5A to 5C are cross-sectional schematic diagrams of the method of fabricating the polyimide resin layer according to the present invention. First, a semiconductor substrate 30 is provided, which comprises many semiconductor devices (not shown) for driving a reflective type LCD, such as thin film transistors, resistors or capacitors. A metal wiring layer (not shown) is formed on a predetermined area of the substrate 30 for electrically connecting the semiconductor devices. As shown in FIG. 5A, a polyimide resin layer 32 made of thermoplastic resin is coated on the substrate 30, and then a contact hole 34 is patterned on the polyimide resin layer 32 to expose a predetermined area of the metal wiring layer, and then a heat treatment proceeds for curing the polyimide resin layer 32. The thickness of the polyimide resin layer 32 depends on the requested aperture ratio, and the method of patterning the contact hole 34 depends on whether the polyimide resin layer 32 has photosensitive characteristics or not. If the polyimide resin layer 32 is photosensitive, an exposure process and a development process are preferably employed to etch the exposed area by the developer solution. If the polyimide resin layer 32 is non-photosensitive, a mask with a predetermined pattern is needed to define the etching area and the mask should be stripped after the etching process.

Next, as shown in FIG. 5B, a positive-type photoresist layer 36 is covered on the polyimide resin layer 32 to fill the contact hole 34, and then the upper surface is shaped into a concave/convex profile. In detail, an exposure process is performed on the photoresist layer 36 by using a mask (not shown) with a predetermined pattern, and then a development process is performed to remove the exposed area to make the upper surface of the photoresist layer 36 become a plurality of bumps. Next, a heat treatment is performed on the photoresist layer 36 for rounding the edges of the bumps to have a continuous, symmetrical and concave/convex profile. In the preferred embodiment, the thickness of the photoresist layer 36 is about 2~10

Next, as shown in FIG. 5C, a dry etching process is performed to remove the photoresist layer 36, wherein the etching selectivity of the photoresist layer to the polyimide resin layer 32 is 0.2~5. Because the depression region has a thinner thickness and the protrusion region has a thicker thickness, the concave of the photoresist layer 36 is previously etched off so as to continuously etch the polyimide resin layer 32 until the convex of the photoresist layer 36 is etched off. As a result, after the photoresist layer 36 is etched off, the upper surface of the polyimide resin layer 32 shows a concave/convex profile. Besides, a strip process can be further used to ensure that the photoresist layer 36 is completely removed from the contact hole 34.

When the polyimide resin layer 32 with the concave/convex profile is completed, a reflective film (not shown) made of aluminum can be formed on the upper surface of the polyimide resin layer 32, and thereby the upper surface of the reflective film has a gently curved profile. Also, the reflective film extends to cover the sidewall and bottom of the contact hole 34 so as to electrically connect the metal wiring layer formed on the substrate 30.

Compared with the conventional methods, the polyimide resin layer 32 with the concave/convex profile in the present invention is shaped by etching the photoresist layer 36 without etching and rounding the polyimide resin layer 32.

Consequently, the method is simplified and the uniformity of the upper surface of the polyimide resin layer 32 is well controlled. This can ensure the property of the formation the reflective film.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method of fabricating a reflective type LCD, including the steps of:
   (a) providing a substrate;
   (b) forming a polymer resin layer on the substrate;
   (c) forming a positive-type photoresist layer on the polymer resin layer, wherein the upper surface of the photoresist layer has a convex/concave profile; and
   (d) performing a dry etching process to completely remove the photoresist layer and partially remove the polymer resin layer so as to shape the upper surface of the polymer resin layer into a convex/concave profile.

2. The method as claimed in claim 1, further comprising a step (e): forming a metallic reflective layer to cover the upper surface of the polymer resin layer, and thereby the upper surface of the metallic reflective layer presents a gently curved profile.

3. The method as claimed in claim 1, wherein the polymer resin layer is made of a thermosetting resin material.

4. The method as claimed in claim 1, wherein the step (b) comprises the steps of:
   (b1) coating the polymer resin layer on the substrate; and
   (b2) performing a curing process on the polymer resin layer.

5. The method as claimed in claim 1, wherein the step (c) comprises the steps of:
   (c1) coating the positive-type photoresist layer on the polymer resin layer;
   (c2) performing an exposure process on the photoresist layer;
   (c3) performing a development process on the photoresist layer to remove the exposed area of the photoresist layer and thereby the upper surface of the photoresist layer becomes a plurality of bumps; and
   (c4) performing a curing process on the photoresist layer to round the edges of each bump.

6. The method as claimed in claim 1, wherein in the dry etching process, the etching selectivity of the photoresist layer to the polymer resin layer is 0.2~5.

7. A method of fabricating a reflective type LCD, including the steps of:
   (a) providing a substrate on which a metallic wiring layer is covered;
   (b) forming a polymer resin layer on the substrate to cover the metallic wiring layer;
   (c) forming a contact hole on the polymer resin layer to expose a part of the metallic wiring layer;
   (d) forming a positive-type photoresist layer on the polymer resin layer to fill the contact hole;
   (e) forming the upper surface of the photoresist layer as a convex/concave profile;
   (f) performing a dry etching process to completely remove the photoresist layer and partially remove the polymer resin layer so as to make the upper surface of the polymer resin layer have a convex/concave profile; and
   (g) covering a metallic reflective layer on the polymer resin layer so as to have an upper surface with a convex/concave profile.

8. The method as claimed in claim 7, wherein the polymer resin layer is made of a thermosetting resin material.

9. The method as claimed in claim 8, wherein after forming the contact hole, a curing process is performed on the polymer resin layer.

10. The method as claimed in claim 7, wherein the step (e) comprises the steps of:
    (e1) performing an exposure process on the positive type photoresist layer;
    (e2) performing a development process on the photoresist layer to remove the exposed area of the photoresist layer so as to shape the upper surface of the photoresist layer into a plurality of bumps; and
    (e3) performing a heat treatment on the photoresist layer to round the edges of each bump.

11. The method as claimed in claim 7, wherein in the dry etching process, the etching selectivity of the photoresist layer to the polymer resin layer is 0.2~5.

12. The method as claimed in claim 7, wherein in the step (g), the metallic reflective layer extends to form on the sidewall and bottom of the contact hole and thereby electrically connect to the metallic wiring layer.

13. The method as claimed in claim 7, wherein the polymer resin layer is made of a photosensitive material.

14. The method as claimed in claim 13, wherein the step (c) comprises the steps of:
    (c1) performing an exposure process on the polymer resin layer; and
    (c2) performing a development process on the polymer resin layer to remove the exposed polymer resin layer so as to form the contact hole.

15. The method as claimed in claim 7, wherein in the polymer resin layer is made of a non-photosensitive material.

16. The method as claimed in claim 15, wherein the step (c) comprises the steps of:
    (c1) forming a photoresist layer on the polymer resin layer, wherein the photoresist layer comprises a hole that exposes a predetermined area of the polymer resin layer;
    (c2) performing an etching process to remove the exposed polymer resin so as to form the contact hole; and
    (c3) stripping the photoresist layer off.

* * * * *